United States Patent
Bondar

(10) Patent No.: US 10,161,762 B2
(45) Date of Patent: Dec. 25, 2018

(54) METHOD AND APPARATUS FOR CALCULATING A CORRECTION FACTOR FOR AN ANGULAR MEASURING SYSTEM

(71) Applicant: Micronas GmbH, Freiburg (DE)

(72) Inventor: Yan Bondar, Waldkirch (DE)

(73) Assignee: TDK-Micronas GmbH, Freiburg (DE)

( * ) Notice: Subject to any disclaimer, the term of this patent is extended or adjusted under 35 U.S.C. 154(b) by 123 days.

(21) Appl. No.: 14/854,430

(22) Filed: Sep. 15, 2015

(65) Prior Publication Data
US 2016/0091340 A1    Mar. 31, 2016

(30) Foreign Application Priority Data

Sep. 29, 2014  (DE) .................. 10 2014 114 135

(51) Int. Cl.
| | |
|---|---|
| *G01D 5/244* | (2006.01) |
| *G01P 3/487* | (2006.01) |
| *G01P 3/44* | (2006.01) |
| *G01P 21/02* | (2006.01) |
| *G01C 25/00* | (2006.01) |

(52) U.S. Cl.
CPC .................. *G01C 25/005* (2013.01)

(58) Field of Classification Search
CPC ..... G01D 5/24452; G01P 3/487; G01P 21/02; G01P 3/44
See application file for complete search history.

(56) References Cited

U.S. PATENT DOCUMENTS

| 6,774,642 | B2 | 8/2004 | Lin et al. | |
|---|---|---|---|---|
| 8,024,956 | B2 | 9/2011 | Granig et al. | |
| 8,680,848 | B2 * | 3/2014 | Foletto | G01D 5/145 |
| | | | | 324/207.12 |
| 8,686,720 | B2 * | 4/2014 | Foletto | G01D 5/24452 |
| | | | | 324/173 |
| 9,170,128 | B2 * | 10/2015 | Foletto | G01D 5/145 |
| 9,175,981 | B2 * | 11/2015 | Foletto | G01D 5/145 |
| 2002/0011840 | A1 * | 1/2002 | Li | G01D 5/147 |
| | | | | 324/207.21 |
| 2002/0167310 | A1 * | 11/2002 | Wallner | G01D 5/24409 |
| | | | | 324/207.25 |
| 2007/0174015 | A1 * | 7/2007 | Steinlechner | G01D 5/24452 |
| | | | | 702/94 |

(Continued)

FOREIGN PATENT DOCUMENTS

EP    1293752 A1    3/2003

*Primary Examiner* — David A Rogers
(74) *Attorney, Agent, or Firm* — 24IP Law Group; Timothy Dewitt

(57) ABSTRACT

A method for computing a correction factor (KF) for an angular measuring system (10) comprising a measurement of a first output value ($W_1$) in a first measuring position (20) and a measurement of a second output value ($W_2$) in a second measuring position (30). An actual value (DI) is formed from the difference between the first output value ($W_1$) and the second output value ($W_2$), and a target value (DS) is formed from the difference of target values ($S_1$, $S_2$) in the first measuring position (20) and in the second measuring position (30). The correction factor (KF) is computed from the ratio of the target value (DS) to the actual value (DI).

9 Claims, 4 Drawing Sheets

(56) References Cited

U.S. PATENT DOCUMENTS

| | | | |
|---|---|---|---|
| 2007/0276562 A1* | 11/2007 | Desbiolles | B62D 15/024 |
| | | | 701/36 |
| 2008/0017149 A1* | 1/2008 | Kokubo | F01L 1/022 |
| | | | 123/90.16 |
| 2008/0036454 A1* | 2/2008 | Landrieve | F16C 41/007 |
| | | | 324/207.25 |
| 2008/0164867 A1* | 7/2008 | Steinich | G01D 5/145 |
| | | | 324/207.2 |

* cited by examiner

METHOD AND APPARATUS FOR CALCULATING A CORRECTION FACTOR FOR AN ANGULAR MEASURING SYSTEM

CROSS REFERENCE TO RELATED APPLICATIONS

This application claims priority to and benefit of German Patent Application No. DE 10 2014 114 135 entitled "Method and Apparatus for the Calibration of an Angular Measurement System" filed on Sep. 29, 2014, the disclosure of which is hereby incorporated herein in its entirety.

BACKGROUND TO THE INVENTION

Field of the Invention

The invention relates to a method for calculating a correction factor for an angular measuring system and an apparatus for calibrating an angular measuring system.

Brief Description of the Related Art

Measuring systems for measuring a rotation angle are known in the art. For example the company Micronas GmbH, Freiburg, Germany, manufactures several different systems for the contactless measurement of a rotation angle of a rotation axle for a number of applications. The contactless measuring systems have, for example, a disk-shaped permanent magnet attached to the front of an axle. The axle rotates about a rotation axis and the measuring system can measure the rotational angle of the axle.

The company Hella, Lippstadt, Germany, manufactures an angular sensor on the basis of an inductive system, which is distributed under the trade name SIPOS.

A capacitive measuring system for measuring a rotation angle is known from the U.S. Pat. No. 6,774,642.

The measuring systems need to be calibrated before they can be used. In particular, the so-called "gain mismatch" (inaccuracies upon amplification of the sensor signals) needs to be taken into account. The prior art methods for calibrating the measuring systems require a measurement of the two orthogonal components of the sensor signal of the sensor over a full revolution (360°) of the axle. The minimum and maximum values of the components of the sensor signal and a correction factor are subsequently calculated.

A further method for computing the gain mismatch is the so-called oval-fit method, which requires merely several measuring points (more than 5 and optimally 30-40) of the two orthogonal components. This method has the advantage that a measurement over a full revolution is not required. However, this method requires a measurement over an angular range of more than 180°.

When the measuring systems are calibrated, it is not always possible to rotate and position the axle by the full 360° (or >180°). This limitation can lead to an inaccuracy in the calculation of the position of the axle. The measurement of several measuring points also requires more time. It is possible to reduce the number of measuring points in order to limit the time required for the calibration. However, this reduction in the number of the measuring points also leads to a greater inaccuracy in the calculations. In some cases, it is also impossible to measure the two orthogonal components.

SUMMARY OF THE INVENTION

In order to improve the calculation of the rotational angle, a method for calculating a correction factor for the angular measuring system is described. The method encompasses a measurement of a first output value in a first measuring position of an axle and of a second output value in a second measuring position of the same axle. An actual value is formed from the difference between the first output value and the second output value. A target value is formed from the difference of target values in the first measuring position and the second measuring position. The correction factor is calculated from the ratio of the target value to the actual value. This method enables the calculation of a correction factor, even if the angular difference between the first measuring position and the second measuring position amounts to less than 50°. The amplitude of one of the orthogonal components can be corrected with the aid of the correction factor.

For a more exact computation of the correction value, a first measuring position and/or a second measuring position of the axle is chosen, at which the sine value or the cosine value of the angle at the first measuring position and/or the second measuring position is substantially equal to a value of 0 or 1. The correction factor can be made more precise by measuring further output values in several further measuring positions. These further output values are then used additionally for the calculation of the correction factor.

An apparatus for calibrating the angular measuring system is also described. This apparatus comprises a sensor for measuring a first output value in a first measuring position and a second output value in a second measuring position. The apparatus also has a computing unit, which calculates a correction factor from the ratio between the actual value and the target value and applies it to later measurements.

In one embodiment, the sensor is a Hall sensor, but this embodiment is not limiting of the invention. The method and the apparatus disclosed herein can be used in many applications, e.g. in accelerator pedals, brakes, throttle valve, etc.

DESCRIPTION OF THE DRAWINGS

For a better understanding of the invention, an exemplary embodiment will now be explained with reference to the drawings, wherein the invention is not limited to this exemplary embodiment.

DETAILED DESCRIPTION OF THE INVENTION

Figure 1:
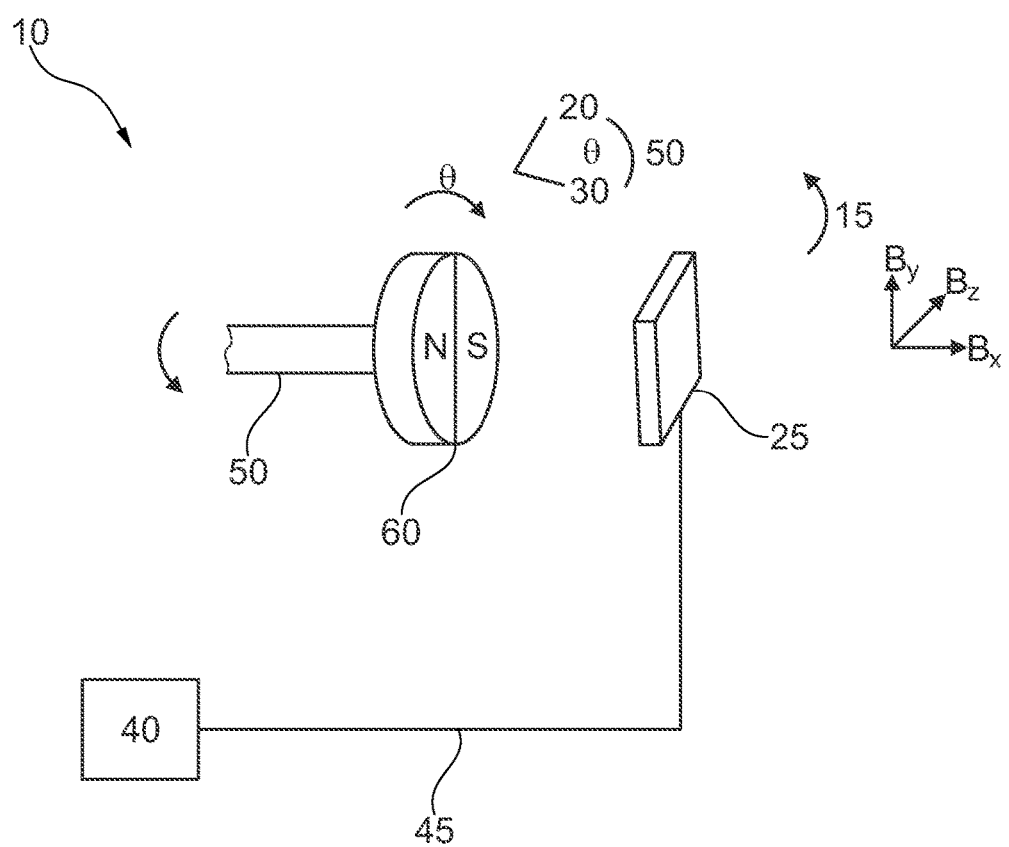
FIG. 1 shows an overview of an angular measuring system.

FIG. 1 shows an angular measuring system 10 for measuring an angle θ of a rotating axle 50. The rotating axle 50 has a permanent magnet 60 attached to the front face 55 of the rotating axle 50. The permanent magnet 60 has a south pole S and a north pole N. A sensor 25 is arranged opposite to the permanent magnet 60. In one aspect, the sensor 25 comprises a multiplicity of two-dimensional or three-dimensional Hall sensors, which measure two orthogonal components $B_x$ and $B_y$ of the magnetic field B of the permanent magnet 60. The values of the orthogonal component $B_x$ and $B_y$ are transmitted to a computing unit 40 via connections 45. In other aspects of the invention, the Hall sensor 25 and the permanent magnet 60 can be replaced by a different sensor system, e.g. a capacitive sensor system. The computing unit 40 can be a microprocessor, an ASIC, an external computer, etc.

The sensor 25 contains an amplifier for amplifying different signals from the Hall sensors in the sensor 25. The magnitude of this amplification is different for the different orthogonal components for various reasons, and different amplification factors are needed for the corresponding ones of the measured two orthogonal components $B_x$ and $B_y$ of the magnetic field B in the X and the Y direction. This different amplification leads to the problem of the gain mismatch, as explained above.

Figure 2:
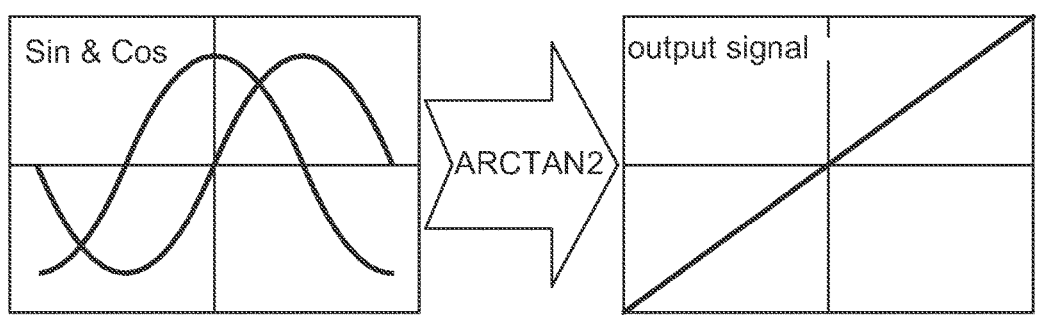
FIG. 2 shows the formation of a linearly rising or falling output signal of two orthogonal components with the aid of the ARCTAN2 function.

For a better understanding of the invention, the arc tangent function with two arguments will be explained. This function is denominated as ARCTAN2 and serves to convert Cartesian coordinates into polar coordinates. In other words, the arc tangent function can compute the rotation angle from the measured orthogonal components $B_x$ and $B_y$. FIG. 2 shows an idealized ARCTAN2 function. The two orthogonal components $B_x$ and $B_y$ of the magnetic field B are identical, and the output signal as a result of the ARCTAN2 function is a linearly rising or falling curve as shown in the figure.

Figure 3A:
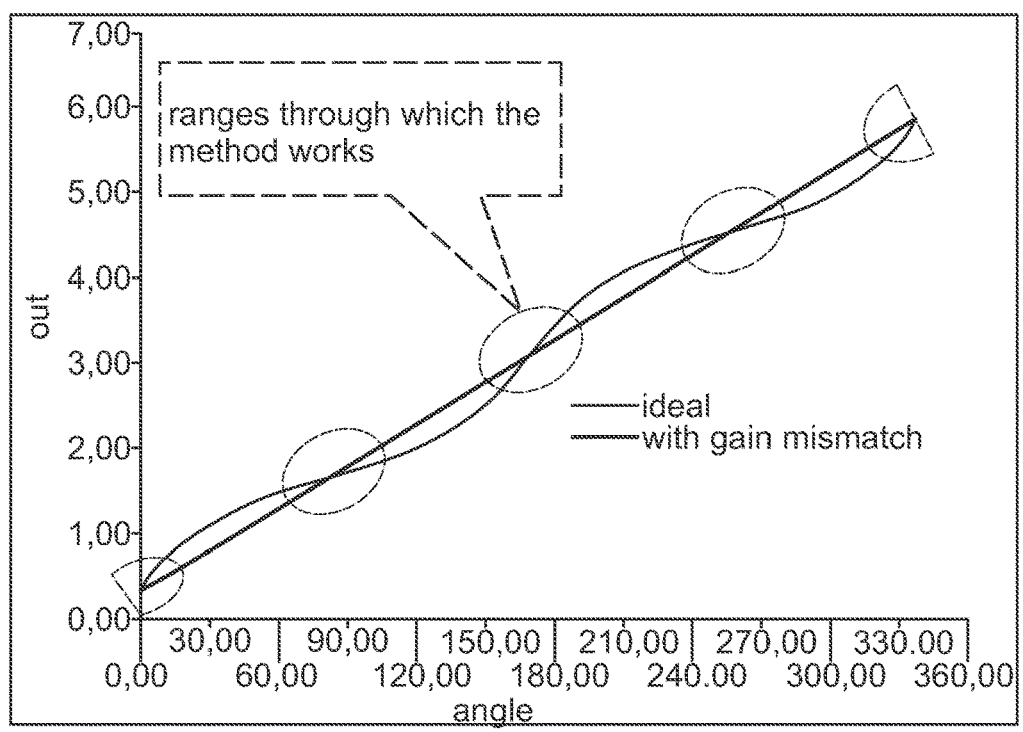
FIG. 3A shows the ideal characteristic and the real characteristic in the angular ranges at which the gain-mismatch calculation with two measuring points of this method is applicable.

In practice, the output signal does not have a linear shape, but contains the shape measured in FIG. 3A, which is designated as a real characteristic (with gain mismatch). FIG. 3A shows both the ideal characteristic as a linearly rising line and the real characteristic. The ratio between the curves in FIG. 3A can be used to compute the correction factors KF for at least one of the orthogonal components $B_x$ and $B_y$ of the magnetic field B. This calculation takes place by measuring one component $B_x$ or $B_y$ of the magnetic field B and has an actual value A. From FIG. 3A the angle α is read off the figure for this actual value A and consequently also the target value B for the component at this angle. This calculation takes place in the computing unit 40, which also stores the values of the real characteristic and the ideal characteristic. FIG. 3A also shows the angular ranges for which the method is applicable.

Figure 3B:
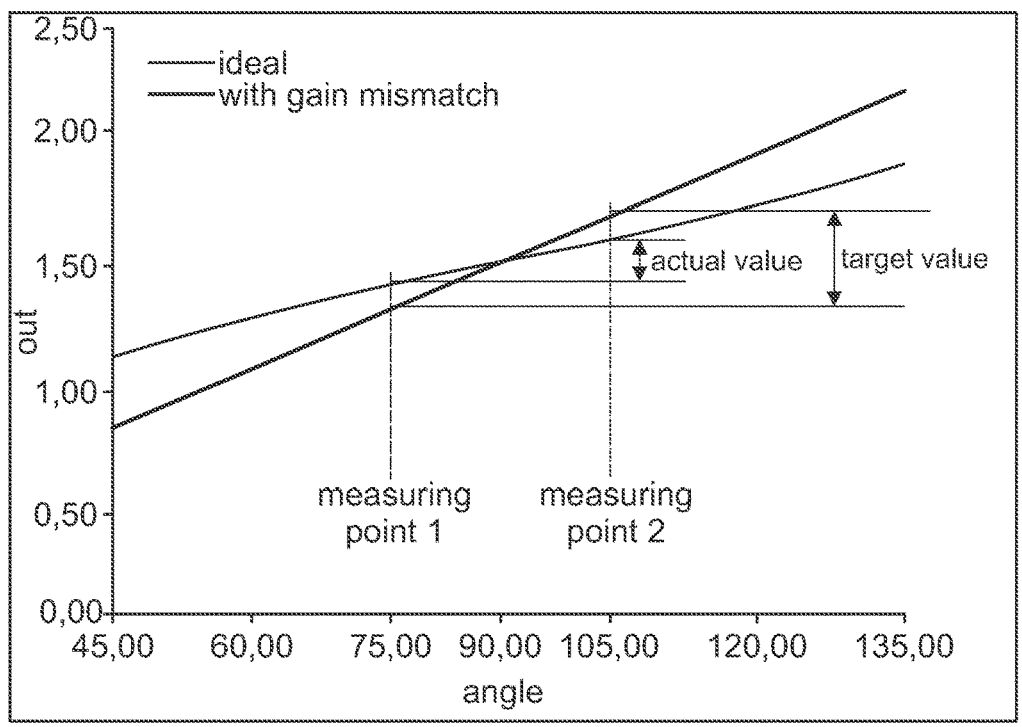
FIG. 3B shows an example of the gain-mismatch calculation.

FIG. 3B shows a detail of FIG. 3A over approximately 40° for two of the measuring points, measuring point 1 and measuring point 2. It can be seen from FIG. 3B that the measured difference between the values of the output signal at the two measuring points ("actual value") is converted into an expected target value with the aid of FIG. 3B.

Figure 4:
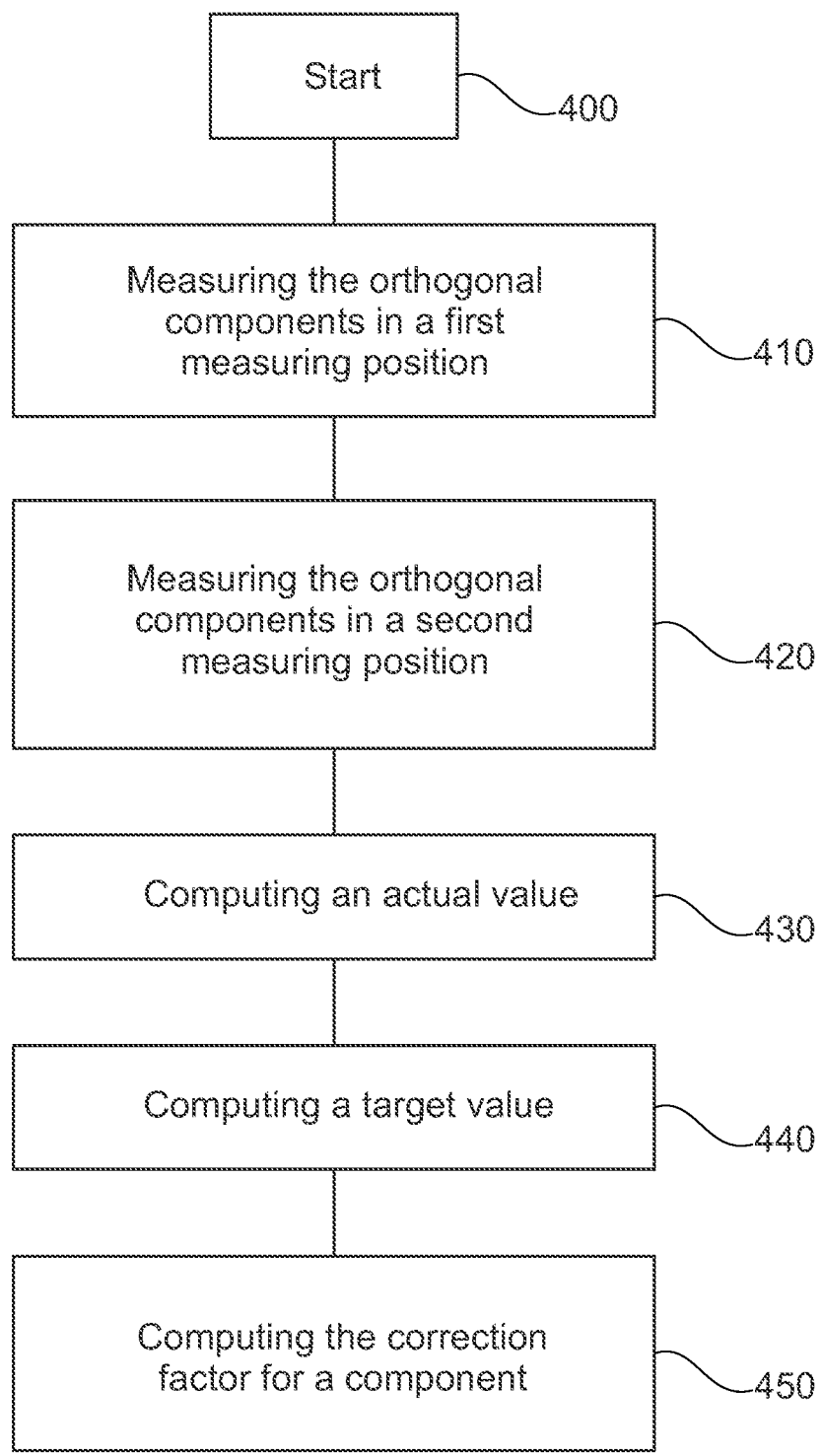
FIG. 4 shows the sequence of the described method.

FIG. 4 shows the sequence of the method for calculating the correction factor KF, which starts in step 400. In a step 410 the sensor 20 is brought to the start of a particular measuring range 15 in a first position 20 (measuring point 1) and the two first orthogonal components $x_1$ and $y_1$ of the magnetic field B are measured. A first output value $W_1$ is computed from the ARCTAN2 function of the values $x_1$ and $y_1$. In a further step 420 the sensor 20 is brought into a second position 30 (measuring point 2) at the end of the measuring range 15 and the two second orthogonal components $x_2$ and $y_2$ of the magnetic field B are measured. A second output value $W_2$ is computed from the ARCTAN2 function of the orthogonal components $x_2$ and $y_2$. In one aspect the measuring range 15 has a size of less than 50°. However, measuring ranges 15 of different sizes are also possible.

From the difference between the first output value $W_1$ and the second output value $W_2$ a differential value DW is computed in step 430. The ideal or target values in the first position 20 (target value S1) and the second position 30 (target value S2) of the measuring range 15 can be gathered from the ideal characteristic in FIG. 3. A difference target value DS is computed from the difference between the target values S1 and S2 in step 450.

In step 450 the correction factor KF is computed for at least one of the orthogonal components x, y by means of the formula:

correction factor *KF*=target value *DS*/actual value *DI*

This correction factor KF can in the future be multiplied with the value of the orthogonal component $B_x$ and/or $B_y$ read out from the sensor, in order to calculate a corrected amplitude for the component of the magnetic field B. The corrected amplitude replaces the read-out amplitude of the sensor signal in the computation of the angle α by the arc tangent function.

This correction factor KF can be used in a sensor 25 for computing the rotation angle, e.g. in accelerator pedals, brakes and throttle valves.

The foregoing description of the preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

LIST OF REFERENCE NUMBERS 10 angular measuring system
15 measuring range
20 first position
25 sensor
25a-b Hall sensors
30 second position
40 computing unit
45 line
50 axle
55 front
60 permanent magnet

What is claimed is:

1. A method for calculating a correction factor for an angular measuring system comprising:
   measuring, using a magnetic field sensor, the first orthogonal components of a magnetic field at a first measuring position of an axle;
   calculating, using a computing unit, a first output value of a first angle of the first measuring position from the acrctan2 function of the measured first orthogonal components;
   measuring, using the magnetic field sensor, the second orthogonal components of a magnetic field at a second measuring position of the axle;
   calculating, using the computing unit, a second output value of a second angle of the second measuring position from the acrctan2 function of the measured second orthogonal components;
   forming an actual value from the difference between the first output value and the second output value;

computing, in the computing unit, a first target value of the first measuring position from one of the first orthogonal components in the first measuring position;

computing, in the computing unit, a second target value of the second measuring position from one of the second orthogonal components in the second measuring position;

forming a difference target value from the difference of the first target value and the second target value in the first measuring position and in the second measuring position;

calculating the correction factor from the ratio of the difference target value to the actual value.

2. The method according to claim 1, wherein the angular difference between the first measuring position and the second measuring position is less than 50°.

3. The method according to claim 1, wherein at least one of the first measuring position or the second measuring position has an angular value and where the sine value or the cosine value of the angular value is substantially amounts 0 or 1.

4. The method according to claim 1, further comprising measuring of further output values in further ones of the measuring positions and use of the further output values for the computation of the correction factor.

5. An apparatus for calibrating an angular measuring system, comprising:
a magnetic field sensor for measuring the first orthogonal components of a magnetic field at a first measuring position and for measuring the second orthogonal components of a magnetic field at a second measuring position;
a computing unit for calculating a first output value of a first angle of the first measuring position from the acrctan2 function of the measured first orthogonal components, for calculating a second output value of a second angle of the second measuring position from the acrctan2 function of the measured second orthogonal components, and for calculating a correction factor from a ratio between an actual value and a difference target value, wherein the actual value is formed from a difference between the measured first output value and the measured second output value, and the difference target value is formed from a difference of a first target value and a second target value in the first measuring position and in the second measuring position, wherein first target value of the first measuring position is computed, in the computing unit, from one of the first orthogonal components in the first measuring position and the second target value of the second measuring position is computed, in the computing unit, from one of the second orthogonal components in the second measuring position.

6. The apparatus according to claim 5, wherein the sensor is a Hall sensor.

7. The apparatus according to claim 5, wherein the angular distance between the first sensor position and the second sensor position is less than 50°.

8. The apparatus according to claim 5, wherein at least one of the first measuring position or the second measuring position has an angular value and where the sine value or the cosine value of the angular value is substantially 0 or 1.

9. The apparatus according to claim 5, having a plurality of further measuring positions for measuring a multiplicity of different output values.

* * * * *